Dec. 20, 1960 R. D. BURBANK ET AL 2,965,525

MAGNETIC ANNEALING

Filed Sept. 24, 1959

INVENTORS R. D. BURBANK
R. D. HEIDENREICH
E. A. NESBITT

BY George S. Indig

ATTORNEY 2,965,525

MAGNETIC ANNEALING

Robinson D. Burbank, Chester, Robert D. Heidenreich, Madison, and Ethan A. Nesbitt, Berkeley Heights, N.J., assignors to Bell Telephone Laboratories, Incorporated, New York, N.Y., a corporation of New York Filed Sept. 24, 1959, Ser. No. 841,993

2 Claims. (Cl. 148—108)

This invention relates to magnetic materials, and more particularly to the controlled processing of such materials so as to enhance their magnetic properties.

This application is a continuation-in-part of copending application Serial No. 770,572, filed October 27, 1958 by R. D. Burbank, R. D. Heidenreich and E. A. Nesbitt, now abandoned.

A variety of magnetic materials, when heat treated in the presence of a magnetic field, are found to exhibit a direction of easy magnetization parallel to the direction in which the field was applied during the heat treatment. The iron-nickel alloys are good examples of such materials: if an annealed 65 percent nickel-35 percent iron alloy is subjected to a magnetic field of 10 oersteds as the alloy cools from 600 to 400 degrees centigrade, the maxisum permeability of the material (in the direction of the applied field) is increased by a factor of 50.

Heretofore, the response of such magnetic materials to heat treatment in a magnetic field has never been satisfactorily explained. The present invention is based on the discovery of the mechanism on which the ability of magnetic alloys to exhibit such a response is dependent.

More specifically, the principles of the present invention depend on the discovery that the presence of oxygen impurity faults in the lattice of a magnetic material is responsible for the ability of the material to be heat treated in a magnetic field, thereby to have its magnetic properties altered.

An understanding of the role played by oxygen impurity faults in the response of materials to heat treatment in a magnetic field (i.e., magnetic annealing) leads to processing approaches in which the level of oxygen impurity faults in the materials is carefully controlled. In this manner, exactly reproducible results or responses to magnetic annealing of specimens from the same or different ingots may be easily realized.

As a general rule, the presence of impurity faults into a magnetic material to be avoided, for the reason that the impedance presented to the movement of a domain wall in a magnetic sample is related to the impurties present in the sample. This impedance, moreover, is irreversible or "frictional," in the sense that switching off a field which has been applied to move a domain wall does not result in the return of the wall to its initial position. In fact, the application of a reverse field would be required to do this. This, of course, is the basis of the phenomenon of hysteresis.

With the phenomenon of hysteresis, which as aforementioned arises from irreversible domain wall motion, there is associated a generation and dissipation of heat. Such dissipation represents lost power. One consideration involved in the design of electrical equipment, such as for example, transformers, is the minimization of this loss. More particularly, hysteresis loss is especially disadvantageous in communications equipment, not only because it represents lost power, but because hysteresis effects may cause harmonic distortion.

An object of the present invention is the improvement of magnetic materials.

A further object of this invention is the control of impurity faults in magnetic materials.

More specifically, an object of this invention is the selective control of the level of oxygen impurity faults in a magnetic material, as a result of which the material will both exhibit a predictable response to heat treatment in a magnetic field and be characterized by minimum hysteresis losses.

These and other objects are realized in an illustrative process embodying the principles of the present invention wherein the level of oxygen impurity faults in a magnetic material is controlled before the magnetic annealing step to fall within a preferred impurity range.

The invention will be more readily understood when taken in conjunction with the following drawings in which.

Figures 1, 2, 3:
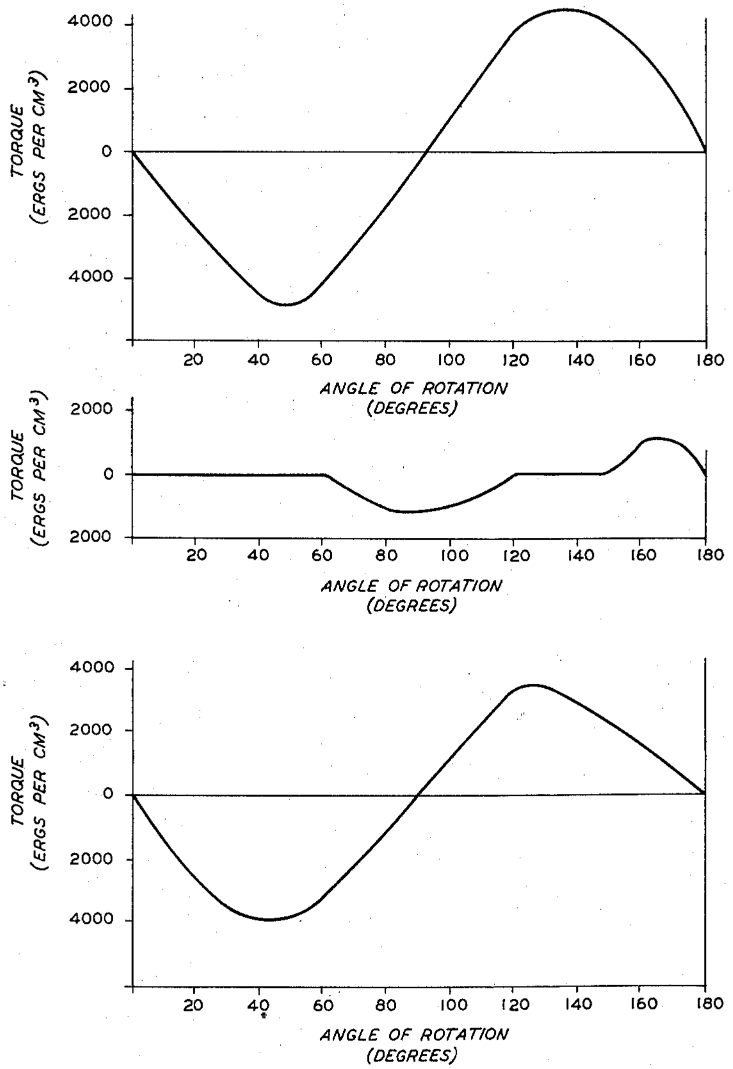
Fig. 1 depicts a magnetic torque curve exhibited by a single crystal of Permalloy following oxidizing treatment and magnetic anneal in accordance with this invention.
Fig. 2 depicts a magnetic torque curve exhibited by the single crystal, whose properties are shown in Fig. 1, following treatment in dry hydrogen and magnetic anneal.
Fig. 3 depicts a magnetic torque curve exhibited by the single crystal whose properties are shown in Fig. 2 following oxidizing treatment and magnetic anneal.

With reference now more particularly to Fig. 1, there is depicted a magnetic torque curve of a single crystal specimen of Permalloy (65 percent nickel-35 percent iron, by weight). Prior to measuring the magnetic torque, the single crystal specimen was treated at a temperature of 750° C. for a period of 10 hours in an atmosphere of hydrogen which had been saturated with water vapor at room temperature. Such treatment tends to have an oxidizing effect on the sample. The specimen was then magnetically annealed in the [111] direction by heating it to a temperature slightly above the Curie point and cooling to room temperature while applying a magnetic field in the proper direction. The magnetic torque curve depicted in Fig. 1 was then measured in the (110) plane using standard procedures.

The torque curve depicted in Fig. 1 indicates that a high degree of uniaxial anisotropy was realized by the foregoing treatments. This high anisotropy, in turn, indicates that the single crystal specimen was possessed of a high loop squareness.

The specimen, following the treatment described above, was then heated to a temperature of approximately 1175° C. for approximately 48 hours in an atmosphere of dry hydrogen. This treatment has a reducing effect and tends to minimize the oxygen content of the specimen. Subsequent to the dry hydrogen treatment, the single crystal was again magnetically annealed in the [111] direction. The magnetic torque curve depicted in Fig. 2 indicates that the crystal exhibited a relatively low degree of anisotropy. Accordingly, a soft magnetic material in such state would be advantageous for use in electrical equipment such as transformers where power loss is desirably low.

The specimen was again treated in wet hydrogen at a temperature of 750° C. for a period of approximately 10 hours. The single crystal was then magnetically annealed in the [111] direction. The magnetic torque curve of Fig. 3 illustrates the anisotropy exhibited by the single crystal after such treatment. It is noted that the curve of Fig. 3 very closely resembles that of Fig. 1. It is considered that this similarity stems from the identity of oxygen content of the single crystal at the time the measurements for Figs. 1 and 3 were made. In line with this reasoning, the phenomenon of relatively low anisotropy indicated by the curve of Fig. 2 is attributed to the relatively low oxygen content of the sample following the dry hydrogen treatment.

The data obtained by the experiments represented by Figs. 1 through 3 suggests a novel method of processing soft magnetic materials in accordance with the desired end use. Thus, for example, soft magnetic materials which are to be employed in magnetic memory devices wherein high loop squareness is desired should be treated by an oxidizing atmosphere prior to magnetic anneal. On the other hand, the fabrication of components which are destined for use in power equipment or communications devices, are desirably exposed to a strong reducing atmosphere prior to magnetic anneal.

The principles of this invention, in addition to being applicable to the specific alloy described in connection with Figs. 1 through 3, may also be used in connection with the treatment of a wide range of soft magnetic alloys including Perminvar (45 percent nickel, 30 percent iron, 25 percent cobalt by weight), Permendurs (iron-cobalt alloys), Permalloys (iron-nickel alloys), and alloys of cobalt and nickel. Additionally, the invention may be practiced advantageously on thin evaporated magnetically annealable films of iron, nickel, cobalt, and mixtures thereof.

Illustratively, it has been found in the instance of Perminvar, that the inclusion therein of 14–21 parts per million by weight of oxygen is advantageous, in that an impurity level in this range results in the alloy both responding to magnetic annealing and exhibiting a low hysteresis loss.

It is to be noted that 14–21 parts per million is an impurity range in which the oxygen impurity levels of conventionally fabricated Perminvar samples do not fall.

It is further to be noted that it has been found that Perminvar samples having an oxygen impurity level of only one part per million will not respond to magnetic annealing. Perminvar samples having oxygen impurity levels in the range greater than one part and less than fourteen parts may also respond to magnetic annealing, but the preferred range for such response is 14–21 parts.

One specific illustrative processing method for providing a magnetically annealed Perminvar specimen having an oxygen impurity level within the above specified range includes combining in an aluminum oxide crucible commercial grade samples of the elements nickel, iron and cobalt, in the weight relationship 45 percent nickel, 30 percent iron and 25 percent cobalt. (Illustratively, the samples may respectively comprise nickel composed of at least 99.9 percent nickel by weight and having about 0.005 percent oxygen, iron composed of at least 99.9 percent iron by weight and having about 0.02 percent oxygen, and cobalt composed of at least 99.9 percent cobalt by weight and having about 0.06 percent oxygen.)

In a pure hydrogen atmosphere, or alternatively in a high vacuum (about $10^{-6}$ millimeters of mercury), the crucible with its charge of pure elements is raised to a temperature of about 1400° C., thereby to melt the charge. Typically, the molten charge is maintained at 1400° C. for about one hour, after which time it is lowered to room temperature (about 20° C.) at a rate of about 23° C. per minute. From this ingot of Perminvar there is then cut a convenient section, for example, about 0.014 inch thick (which is a typical thickness of a lamination utilized as a component part of a communications transformer).

The section is then advantageously subjected to a heat treatment (without an applied magnetic field), the purpose of which is to outgas or lower the oxygen content of the section, and, also, to relieve any mechanical strains imparted to the section during its fabrication. This heat treatment, which involves heating the section to as close to its melting point as possible without causing a flow of the alloy, illustratively in the case of Perminvar, to about 1375° C., may take place in a pure hydrogen atmosphere for between two and three days, or in a high vacuum for two and three hours.

Then, by standard and well-known techniques, for example, by a vacuum fusion method, an oxygen analysis of the section is conducted. If this analysis reveals a level of oxygen impurity above the preferred range, 14–21 parts per million for Perminvar, the section is then again outgassed in accordance with the procedure therefor given above. If, on the other hand, the analysis reveals an oxygen level below the preferred range, the section may be treated in an oxidizing atmosphere (such as hydrogen containing a controlled water vapor content) to increase the oxygen content of the alloy to a level falling within the specified range.

Lastly, the section is heated to just above its Curie temperature, which for Perminvar is about 700° C., at which temperature it is maintained until equilibrium is established, typically about five to ten minutes. Then, the section is cooled to room temperature at a rate of about 60° C. per hour, during which time a magnetic field of approximately 1 to 100 oersteds is applied to the section in a given direction.

Thus, in the manner described above, there may be fabricated a magnetically annealed section characterized by an oxygen impurity level within a preferred range and, therefore, by a desirably low hysteresis loss and a high permeability in the direction of the annealing field. Significantly, the step of controlling the oxygen impurity level of the section results in a predetermined and exactly reproducible response to the magnetic annealing step.

It is noted that the oxygen faults in a magnetic material processed in accordance with the principles of the present invention tend, in response to magnetic annealing, toward local spinel oxide geometry.

It is to be understood that the specific process hereindescribed is merely illustrative of the general principles of the present invention. For example, the principles of this invention encompass within their scope the basic concept of controlling the oxygen impurity fault level of a number of soft magnetic materials, in that way enabling the attainment of exactly reproducible and predictable responses to magnetic annealing. (By "soft magnetic materials" is meant materials having a coercivity of less than 2 oersteds.)

Furthermore, aspects of the principles of the present invention extend to the "activation" of magnetic materials which under ordinary or normal conditions do not respond to magnetic annealing. Such activation may occur when the oxygen impurity content of such a material is increased to an above-normal level, whereby there are initially produced therein oxygen faults, which tend in response to magnetic annealing finally to form a spinel oxide type of internal oxidation.

It is to be understood that the various specific materials and techniques disclosed herein are merely illustrative of the general principles of the present invention. Other similar arrangements may be easily devised by those skilled in the art without departing from the spirit and scope of this invention.

What is claimed is:

1. A method of processing Perminvar which comprises the steps of establishing therein an oxygen impurity content of 14–21 parts per million by weight, heating the material to just above its Curie temperature of 700° C., maintaining the material at said temperature for five to ten minutes, then cooling the material to 20° C. at a rate of about 60° C. per hour while applying thereto a magnetic field of between 1 and 100 oersteds in a given direction.

2. A method of processing a soft magnetic material of the group consisting of Permalloy and Perminvar, said material having oxygen as an impurity therein, which comprises the steps of reducing the level of said impurity to a value between 14 and 21 parts per million by weight, heating the material to above its Curie temperature and thereafter slowly cooling said material under the influence of a unidirectional magnetic field.

References Cited in the file of this patent

UNITED STATES PATENTS

| | | |
|---|---|---|
| 2,145,712 | Dahl et al. | Jan. 31, 1939 |
| 2,192,032 | Dahl et al. | Feb. 27, 1940 |